G. J. BENNETT.
NUT LOCK.
APPLICATION FILED MAR. 14, 1916.
1,198,884. Patented Sept. 19, 1916.
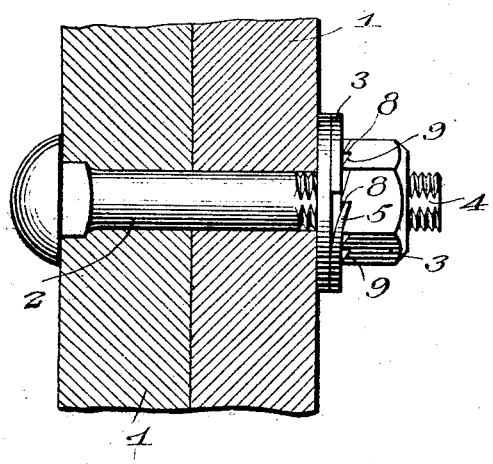
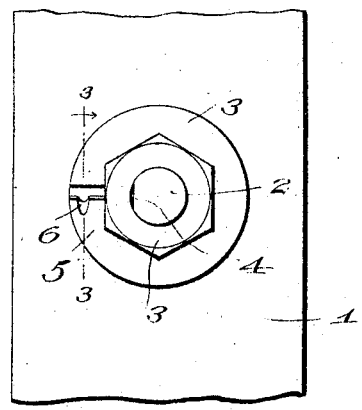
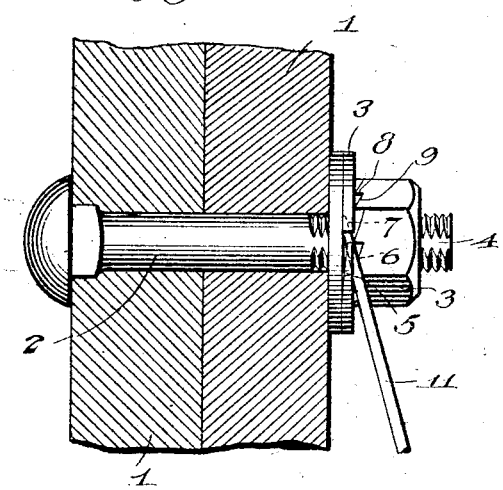
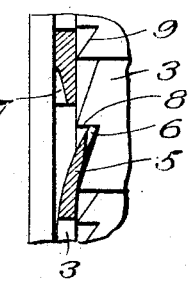
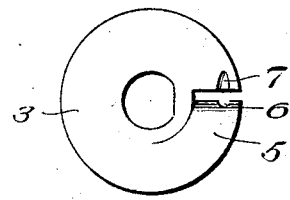
Witness
Hugh H. Ott
Inventor
G. J. Bennett
By Victor J. Evans
Attorney

UNITED STATES PATENT OFFICE.

GEORGE J. BENNETT, OF ASBURY, WEST VIRGINIA.

NUT-LOCK.

1,198,884.  Specification of Letters Patent.  Patented Sept. 19, 1916.

Application filed March 14, 1916. Serial No. 84,185.

*To all whom it may concern:*

Be it known that I, GEORGE J. BENNETT, a citizen of the United States, residing at Asbury, in the county of Greenbrier and State of West Virginia, have invented new and useful Improvements in Nut-Locks, of which the following is a specification.

This invention relates to improvements in means for locking a nut upon a bolt and an object of the invention is to construct a nut lock in the nature of a washer member that is disposed to surround the bolt to contact with the frame or superstructure through which the bolt is inserted and to co-engage with the nut to hold the same against rotation.

Another object of the invention is to produce a nut locking washer which is of a greater diameter than the nut with which it co-acts to slit the said washer inwardly from its periphery, and longitudinally from the terminal of the said slit providing one of the edges formed by the slit with a lip, the underface of which being beveled and the lip being projected above the surface of the washer proper to engage with grooves or perforations upon the inner face of the nut and to provide the said washer with a slot or groove arranged upon the lip thereof and also upon the shoulder of the wall provided by the slit opposite the lip, whereby a suitable instrument may be inserted which upon being forced in the direction of the washer will compress the lip to permit of the unscrewing of the nut from the bolt.

With the above and other objects in view the improvement resides in the construction, combination and arrangement of parts set forth in the following specification and falling within the scope of the appended claim.

In the drawing: Figure 1 is a sectional view through a structure connected by a nut and bolt, the nut being locked upon the bolt in accordance with the present invention; Fig. 2 is a face view of the same looking toward the nut and washer; Fig. 3 is a sectional view approximately on the line 3—3 of Fig. 2; Fig. 4 is a view of the inner face of the washer; and Fig. 5 is a view illustrating the manner in which the lipped end of the washer is compressed or forced below and in a line with the surface of the washer to permit of the unscrewing of the nut from the bolt.

In the accompanying drawing the numeral 1 designates suitable plates which are connected by a bolt 2, the said bolt being provided with a securing nut 3. The bolt may have arranged thereon one or a number of ordinary washers and these washers may have their inner faces serrated and formed with engaging teeth which feature is especially desirable when the device is to be employed on a wooden structure.

The locking washer is indicated by the numeral 3 and comprises a metal member which is of a greater cross sectional diameter than that of the nut.

The threaded shank of the bolt preferably has one of its sides flattened, as indicated by the numeral 4, and the bore or central opening of the washer is formed with a straight wall to engage with the said shoulder. The washer, preferably opposite the referred to straight wall in the bore thereof is slotted radially from its periphery to a suitable distance away from the bore or opening thereof and is further slotted longitudinally from one of the walls provided by the first mentioned slot and the metal is bent upwardly to form a spring tongue 5. The underface of the washer below the tongue is beveled outwardly to the engaging edge of the tongue, as clearly illustrated in the drawings, and the tongue at what I will term the outer edge thereof is formed with a depression 6 which registers with a similar and substantially cone-shaped depression that is arranged angularly upon the underface from the straight wall or shoulder provided by the referred to radial slot, the said depression being indicated by the numeral 7.

If desired the inner face of the washer may be roughened or serrated so that the same will effectively grip upon the surface against which it abuts, and the inner face of the nut 2 is provided with radial depressions which terminate a suitable distance away from the bore of said nut and provide straight shoulders 8 and angular walls 9 connecting the shoulders. The teeth provided by the shoulders will contact with the projecting tongue of the washer and ratchet over the same when the nut is being screwed home upon the bolt. The contact of the nut upon the locking washer will force the same into tight engagement with the structure 1 and as the engagement of the straight surface of the bore of the washer with the non-threaded surface of the bolt will prevent the turning of the bolt, the bolt, nut and washer will be effectively locked together. As stated, the washer is of a greater cross sectional diameter than that of the nut, and the depression 6 in the tongue of the washer is not closed by the nut, so that a suitable instrument 11 shown in Fig. 5 of the drawings may be inserted through the depression 6 and to be received within the angular depression 7, and the member 11 when forced in the direction of the plates or structure 1 will compress the tongue of the washer and force the same also in the direction of the said plates 1 and below the teeth of the nut, thus permitting the unscrewing of the nut.

Having thus described the invention, what I claim is:

In a means for securing a nut upon a bolt, the combination with a bolt having a nut screwed thereon, of a washer of a greater cross sectional diameter than the nut disposed upon the bolt to be contacted by the nut, said washer being slitted radially and longitudinally and provided with an upturned spring tongue whose under face is beveled and formed with a depression, the washer having a cone-shaped depression opposite the tongue, and the inner face of the nut being formed with teeth to be engaged by the tongue, all as and for the purpose set forth.

In testimony whereof I affix my signature in presence of two witnesses.

GEORGE J. BENNETT.

Witnesses:
W. G. RATLIFF,
S. V. BURGESS.

Copies of this patent may be obtained for five cents each, by addressing the "Commissioner of Patents, Washington, D. C."